Patented May 2, 1944

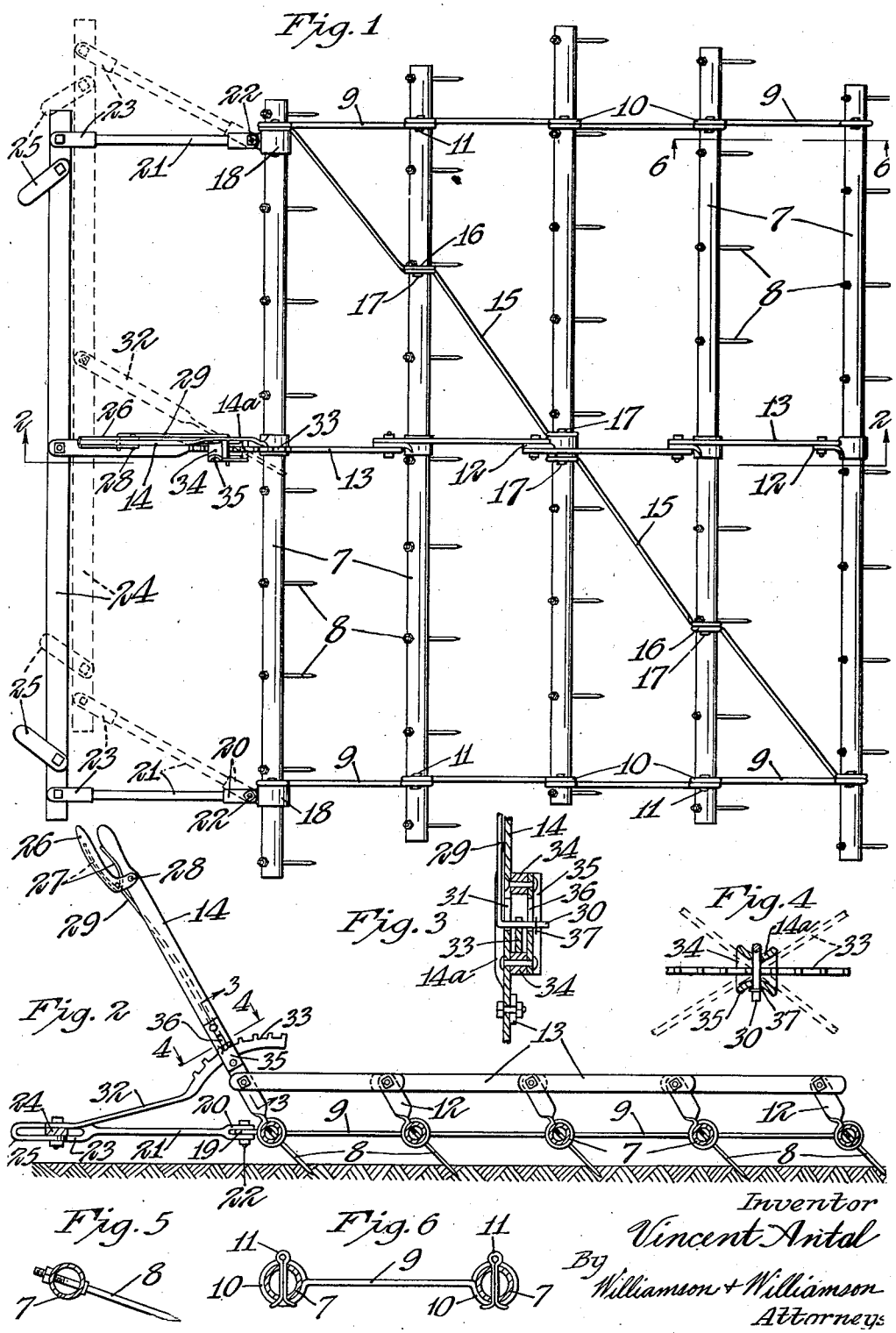

2,347,979

UNITED STATES PATENT OFFICE 2,347,979

FLEXIBLE ADJUSTABLE LEVER DRAG HARROW

Vincent Antal, Owatonna, Minn.

Application November 4, 1942, Serial No. 464,460

2 Claims. (Cl. 55—103)

This invention relates to flexible drag harrows.

In my prior Patent Number 2,327,236, I disclosed and claimed a drag harrow which is flexible so that it will effectively ride over uneven ground, and wherein the harrow is adjustable so that the teeth thereof can be adjustably set to similar angular positions to vary the effective depth of the teeth in the ground. The harrow teeth are arranged on a plurality of transversely positioned bars which are simultaneously rotatable and are vertically swingable relative to each other. The angular adjustment of the teeth is effected by operating a hand lever connected to links which interconnect the rotatable bars. In said above identified application the hand lever was located on the rearmost of the plurality of transverse bars. It has been found, however, that by locating the hand lever on the rearmost bar there is a tendency for the forward portion of the harrow to buckle.

One of the objects of the present invention is to so arrange the linkage connecting the bars and hand lever for rotating the bars that buckling of the harrow is eliminated.

More specifically it is an object of the invention to locate the hand lever for rotating the bars on the foremost bar and to connect said lever to the foremost of the links interconnecting the bars.

It is another object of the invention to provide a draft bar which is spaced forwardly from the foremost of the harrow bars and connected to said foremost harrow bar in a manner which will permit the draft bar to shift laterally relative to the harrow bars.

Still another object of the invention is to provide a connection in the form of a compression member between said draft bar and the foremost of said links interconnecting said harrow bars to further prevent buckling of said harrow.

These and other objects and advantages of the invention will more fully appear from the following description made in connection with the accompanying drawing, wherein like reference characters refer to the same parts throughout the views, and, in which:

Fig. 1 is a plan view of the harrow with the draft bar shown in a laterally shifted position in dotted lines;

Fig. 2 is a longitudinal vertical section through the device;

Fig. 3 is an enlarged vertical section taken on the line 3—3 of Fig. 2;

Fig. 4 is an enlarged section taken on the line 4—4 of Fig. 2;

Fig. 5 is a transverse section through one of the harrow bars; and

Fig. 6 is a transverse sectional view through two harrow bars showing their connections.

The harrow includes a series of transversely disposed spaced bars 7 which are preferably of tubular construction. The bars 7 have drag teeth 8 mounted thereon and it should be noted that the teeth of each one of the bars is placed out of alignment with those teeth on the other bars to secure effective working of the soil. This staggered relationship of the drag teeth 8 is secured by staggered positioning of the bars 7, thus making it possible to make all the bars alike and eliminating the necessity for special bars for each position. Connecting adjacent ends of the adjacent harrow bars 7 are rod-like links 9 having eyes 10 at their ends to fit around the ends of said bar 7. The eyes 10 on the links 9 permit the bars to be rotated relative to the links so that the teeth 8 can be swung to different angular positions, and also permitting one of the bars 7 to swing vertically relative to the other bars. Movement of the bars 7 longitudinally of their axes is prevented by cotter keys 11 which are run through said bars 7 at either side of the eyes 10 on the links 9. In some cases one of the cotter keys can be dispensed with where the eyes 10 on the links 9 lie closely adjacent some of the teeth 8 on the harrow bars.

Secured to medial portions of the bars 7 are brackets or levers 12 whose lower ends are rigidly connected to said bars 7 and whose upper ends are interconnected by links 13 which are themselves pivotally connected at adjacent ends. The levers 12, as shown in Fig. 2, are present on all of the harrow bars 7 except the leading bar which has a considerably longer hand lever 14 connected thereto. The hand lever 14 is also pivotally connected to the foremost of the links 13 at the forward end of said link. Thus when the lever 14 is shifted it will move the links 13 and levers 12 to partially rotate the harrow bars 7 and change the angular positions of the drag teeth 8.

In order to brace the harrow against side draft and side movement of the various harrow bars 7, I provide a plurality of diagonally disposed braces 15 which have eyes 16 at their ends to rotatably receive the several harrow bars 7. It is preferred that the line of braces 15 extend from the right front corner of the group of bars to the left rear corner thereof. Where the eyes 16 on the diagonal braces 15 do not lie adjacent some of the drag teeth 8 I provide cotter keys 17 which extend through the harrow bars 7 in the same manner as the keys 11 described above.

The leading or foremost harrow bar 7 has a pair of collars 18 rotatably mounted thereon adjacent its ends and each of the collars 18 has a flat tongue 19 extending forwardly therefrom to receive the forked end 20 of a forwardly extending rod 21. A pivot bolt 22 pivotally interconnects the forked end of the rod 21 and the tongue 19. The rods 21 have forked forward ends 23 which are pivotally connected to a draft bar 24, and said draft bar 24 has a pair of U-shaped hitch members 25 pivotally mounted thereon adjacent the ends of the bar 24. The hitch members 25 are adapted to be suitably connected to a draft chain or other draft device so that the harrow can be pulled in the customary manner. It will be noted in Fig. 1 that the draft bar 24 is shiftable laterally with respect to the plurality of harrow bars to facilitate turning of the harrow in the field.

The hand lever 14 is provided at its upper end with a pivoted grip 26 which is normally swung outwardly away from the lever 14 by means of a spring 27 which is interposed between the upper end of the handle 14 and the inner side of the pivoted grip 26. The grip 26 is connected to the handle 14 by a pivot pin 28. A rod 29 is connected to the grip 26 at a point offset from the pivot 28 as shown in Fig. 2, and said rod extends downwardly along the side of the lever 14 and the lower end of the rod 29 is bent at right-angles as shown at 30 in Fig. 3. The bent portion 30 of the rod 29 extends through a slot 31 formed in the lever 14. Thus when the pivoted grip 26 on the upper end of the handle 14 is pressed toward the handle the rod 29 with its bent lower end 30 will be pulled upwardly relative to the handle 14, and when the grip is released the spring 27 will force the grip away from the hand lever 14 and push the rod 29 downwardly.

Extending rearwardly and upwardly from the central portion of the draft bar 24 and pivotally connected thereto is an arm 32, the rear end of said arm being in the form of an arcuate rack 33 which lies closely adjacent the hand lever 14 and in a position to be selectively engaged by the lower bent end 30 of the spring pressed rod 29 to locate said hand lever 14 and interconnected harrow bars 7 in any desired angular position. In order to keep the rack 33 close to the lever 14 I provide a pair of spacer blocks 34 above and below the slot 31 in the lever 14. It is preferred that the lower block 34 be positioned directly beneath the curved rack 33 so that said rack cannot be pushed downwardly out of engagement with the bent lower end 30 on the rod 29. On the spacer blocks 34 is mounted a keeper plate 35 having a slot 36 to accommodate the bent end of the rod 29 as shown in Fig. 3, and a spring key 37 is mounted on the end of the bent portion 30 of the rod 29 to prevent the rod from slipping out of the slots 31 and 36.

In Fig. 4 it will be seen that a portion 14a of the hand lever 14 and the keeper plate 35 are concavo-convex in cross section with the convex portions of said hand lever and keeper plate facing each other in spaced relation. At their closest points the lever portion 14a and keeper plate 35 are relatively close to the rack 33 to keep it fairly close to the hand lever 14 and in proper alignment with the bent portion 30 of the rod 29. It will also be seen that due to the curved construction of the hand lever portion 14a and the keeper plate 35 the rack 33 can be swung to different angular positions relative to said hand lever 14 and keeper plate 35 without jamming. This construction is provided because the arm 32 which carries the rack 33 is mounted upon the draft bar 24 which is adapted for lateral swinging movement and the arm 32 and rack 33 move with the draft bar 24. The construction disclosed, as stated above, provides a relatively closely fitting keeper while at the same time permitting freedom of angular movement of the rack 33. In the construction disclosed in my above identified former application it was explained that the hand lever and rack for actuating the links used to rotate the harrow bars was disposed at the rearmost of the harrow bars, and it was found that under some conditions there was a tendency for the forward portion of the harrow to buckle. However, by placing the rack and hand lever adjacent the foremost harrow bar, this tendency to buckle has been eliminated while at the same time permitting the several harrow bars to swing vertically relative to each other when passing over uneven ground. Additionally the arrangement of the rack 33 on the arm 32 supported by the draft bar 24 provides a compression member between said draft bar 24 and the hand lever 14 which assists in keeping the forward bar or bars carrying the drag teeth in proper relation to the ground when any lifting force is exerted on the draft bar 24. The laterally swingable draft bar 24 makes the harrow much easier to turn and the keeper plate arrangement shown in Fig. 4 allows for the flexibility of movement of the draft bar 24 while maintaining engagement between the lower end of the rod 29 and the rack 33.

While the harrow construction shown and described is generally the same as that disclosed in the above identified application, it will be seen that the construction has been changed and improved to such an extent that said construction is considerably superior and operation of the harrow is greatly improved, and while I have shown a specific embodiment of the invention, it will, of course, be understood that various changes may be made in the form, details, arrangement and proportions of the various parts without departing from the scope of my invention.

What is claimed is:

1. A flexible, adjustable drag harrow comprising, a plurality of spaced, toothed bars, links interconnecting adjacent bars, said bars being rotatable relative to said links, means for simultaneously turning all of said bars, means associated with said bar turning means for holding said bars at various substantially similar positions, a draft bar positioned in forwardly spaced relation to the foremost of said first mentioned bars, and connections between said draft bar and said foremost of said first mentioned bars permitting lateral shifting movement of said draft bar relative to said first mentioned bars, and a compression member connected between said draft bar and said toothed bar holding means, said compression member being shiftable with said draft bar.

2. A flexible, adjustable drag harrow comprising, a plurality of spaced, toothed bars, links interconnecting adjacent bars and pivotally connected to each other, said bars being rotatable relative to said links and being vertically swingable relative to each other, a draft bar in forwardly spaced relation with the foremost of said plurality of bars and connected to the foremost of said plurality of bars for lateral shifting movement relative to said plurality of bars, an arm connected to said draft bar and extending rearwardly therefrom to a point adjacent the foremost of said plurality of bars, said arm having a rack formed on its rearward end, a lever connected to the foremost of said plurality of bars and to the foremost of said links, a spring pressed dog on said lever extending transversely of and engageable with said rack, and a keeper for said dog comprising a pair of spaced concavo-convex plates having their convex sides facing each other.

VINCENT ANTAL.